United States Patent [19]

Antunez

[11] Patent Number: 5,035,257

[45] Date of Patent: Jul. 30, 1991

[54] TOILET TANK VALVE

[75] Inventor: Bruce A. Antunez, Glendora, Calif.

[73] Assignee: Coast Foundry & Manufacturing Co., Inc., Pomona, Calif.

[21] Appl. No.: 515,489

[22] Filed: Apr. 25, 1990

[51] Int. Cl.$^5$ ............... F16K 31/18; F16K 33/00
[52] U.S. Cl. ............... 137/414; 73/322.5; 137/425; 137/426; 137/432; 137/449; 137/550; 251/46; 285/303; 285/322
[58] Field of Search ............... 137/410, 414, 424, 425, 137/426, 429, 430, 432, 437, 445, 449, 544, 550; 73/322.5; 4/324, 366, 375, 390, 391; 251/35, 45, 46; 285/303, 322, 390

[56] References Cited

U.S. PATENT DOCUMENTS

| | | | |
|---|---|---|---|
| 2,767,732 | 10/1956 | Hodgson et al. | 137/426 |
| 2,895,499 | 7/1973 | Nelson | 137/432 |
| 3,729,017 | 4/1978 | Brandelli | 137/432 |
| 4,094,327 | 6/1978 | Brandelli | 137/426 |
| 4,182,364 | 1/1980 | Gilbert et al. | 137/426 |
| 4,340,082 | 7/1982 | Straus | 137/426 |
| 4,341,238 | 7/1982 | Roosa et al. | 137/432 |
| 4,431,024 | 2/1984 | Gallagher | 137/426 |
| 4,596,269 | 6/1986 | Stephens | 137/437 |
| 4,600,031 | 7/1986 | Nestich | 137/426 |
| 4,794,946 | 1/1989 | Antunez | 137/426 |

Primary Examiner—George L. Walton
Attorney, Agent, or Firm—Donald D. Mon

[57] ABSTRACT

A toilet tank valve having a vertical riser with a collet thread and a plurality of flexible collet fingers. A slider tube is fitted into the riser. It has a plurality of peripheral grooves that can be engaged by the fingers to adjust the elevation of the slider tube. A collet nut threaded to the riser compresses the finger for this purpose. Valve workings are mounted to the slider tube. They include an inverted cup float slidingly fitted around the riser which can engage splines on the collet nut so that rotating the float can turn the collet nut, enabling the slider tube's elevation to be adjusted and its adjustment retained.

7 Claims, 2 Drawing Sheets

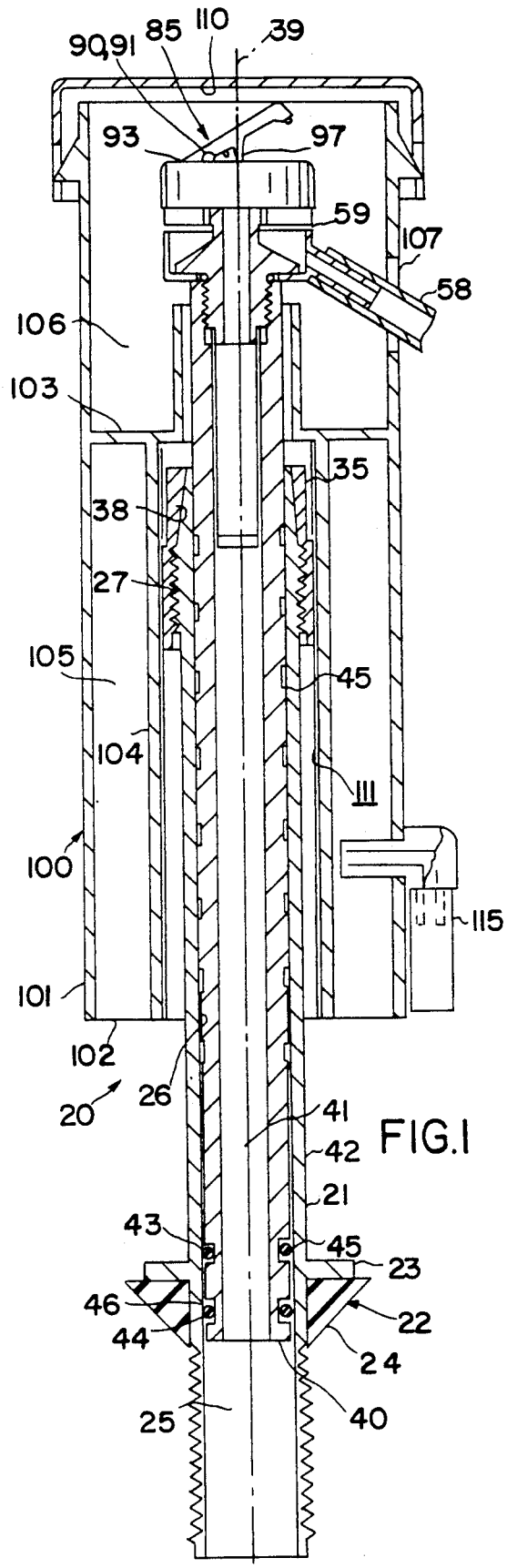
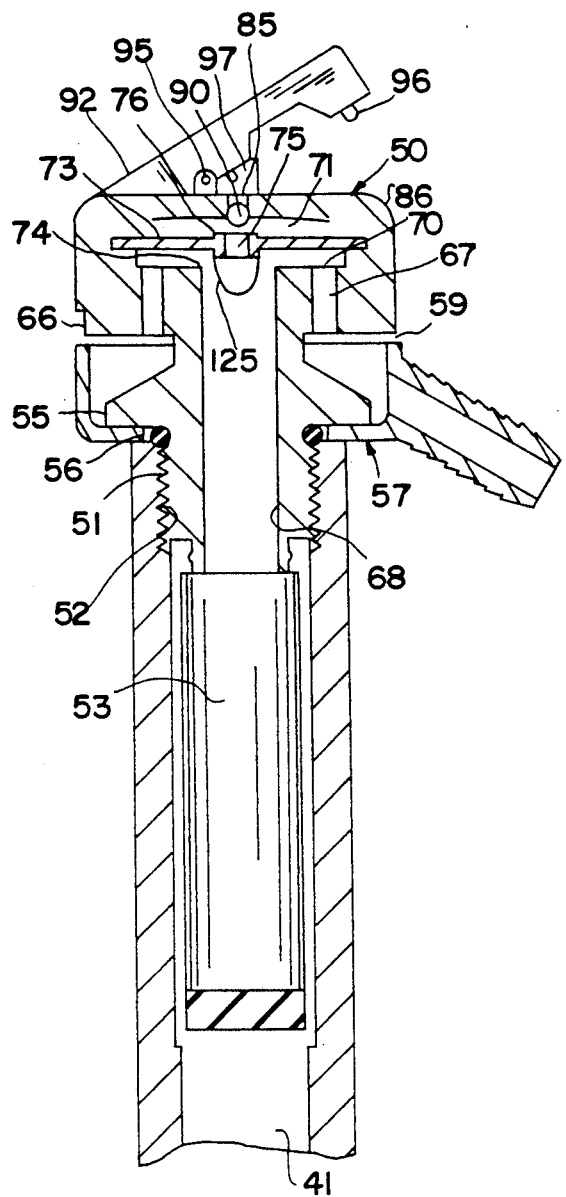
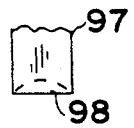
FIG.1
FIG.2
FIG.7

TOILET TANK VALVE

FIELD OF THE INVENTION

This invention relates to tank valves used to refill a toilet tank after each discharge of flush water from the tank.

BACKGROUND OF THE INVENTION

Toilet tank valves function to admit water into a toilet tank after each flush discharge of stored water into the toilet. When the flush valve is closed, the tank valve remains open until the water level rises to a pre-established level. Then it closes, and barring leakage of either one of the valves, the pre-established volume of water remains in storage until the next flush cycle is initiated by opening the flush valve.

Requirements to reduce the volume of water needed for each flush cycle are becoming increasingly stringent. The decreasing availability of water for waste usage, and the overloading of sewer systems by unnecessarily large volumes of water used for a flush cycle, are only two of many reasons why governments are increasingly legislating limits on the types and demands of components of flush-type systems.

Of course the systems themselves include components other than the valves which are of importance. The shapes of the commode and of the tank are two such examples. The over-all objective is to obtain a flush with minimum water—perhaps only a gallon to a gallon and a half—which will clear the commode and provide just sufficient water to convey the waste material to the sewer and to refill the toilet boil.

Not surprisingly, various manufactures have taken different approaches to the problem. A sluggish flow, for example, is unlikely to clear all solid material in a single flush, and the toilet acts sluggishly and may not clear on one flush. For this reason, high velocity of the outlet stream is frequently sought and attained by appropriate design of the height of the maximum water level, and of the internal shape of the tank.

However, as to the manufacturer of the tank valve, the situation becomes more complicated. The "pottery" manufacturer simply wants to buy a lowest cost flush valve for any tank configuration he selects, and for any flushing scheme he may devise. To provide an individually manufactured valve to meet every wish of the customer is clearly impossible. In valves of this type, which should cost on the order of a dollar in view of the large numbers involved, the tooling must be commensurately expensive. Hard tooling cannot be changed to accommodate variations such as fractions of an inch in height, or of any other variable.

Especially for low volume emissions, height of the valve or relative height of the water level is one, but not always the most important parameter. Quick response, least impediment to water flow, freedom from silting up, and freedom from internal functional complications are a few others. As will further be discussed, below, the solution of one problem all to frequently creates a problem of it own.

What the industry requires is a standard, easily installed and serviced, quick-acting tank valve whose control function is very closely related to the water level, which is quickly and reliably activated when the water level departs from a pre-determined level and which holds its closed setting when the water level is at the pre-determined elevation, which enables a rapid flow of water, and whose operation occurs at a suitable rate that does not cause water hammer, or which causes the valve to hang up.

These simply-stated objectives are obvious enough, but many millions of dollars have been spent pursuing them with widely varying approaches to suitability for the intended purpose.

BRIEF DESCRIPTION OF THE INVENTION

A toilet tank according to this invention has a riser tube to be fitted to a toilet tank, through which system water is supplied. A slider tube is sealingly fitted, and axially movable in the riser so its upper end is adjustable. Valve workings are mounted to this upper end.

An inverted cup type float is fitted over the top of the slider tube so it can control an actuator stop the workings to open the valve when the water level is low, and open the valve when the water level is at a predetermined level.

According to a preferred but optional feature of this invention, a collet-type adjustment means is fitted between the riser and the slider tube. The adjustment means includes a collet nut which is engageable by the float, so that turning the float loosens or tightens the collet nut, and enables the slider tube to be axially adjusted relative to the riser. This is the primary adjustment of the valve to pre-determine the filled level of the water in the tank.

According to still another preferred but optional feature of the invention, the workings include a flexible diaphragm which separates a bias chamber and a flow chamber. A bias port through the diaphragm admits water to the bias chamber. A fine screen is fitted over the bias port to exclude fine particulates from the bias chamber.

According to yet another preferred but optional feature of the invention, the actuator is a second class lever with a counterweight and an arm both of which fit within the periphery of the workings. The arm has a tip which limits its downward movement, and an actuator pin so proportioned and arranged as to pass through a vent port in the workings to vent pressure in the bias chamber. The free end of the actuator pin is recessed to receive and laterally stabilize the valving ball.

The above and other features of this invention will be fully understood from the following detailed description and the accompanying drawings, in which:

BRIEF DESCRIPTION OF THE DRAWINGS

FIG. 1 is an axial cross-section of the presently-preferred embodiment of a valve according to this invention;

FIG. 2 is an enlarged, additionally sectioned view as in FIG. 1;

FIG. 7 shows a fragment of an actuator.

DETAILED DESCRIPTION OF THE INVENTION

Figures 3, 4, 5, 6:
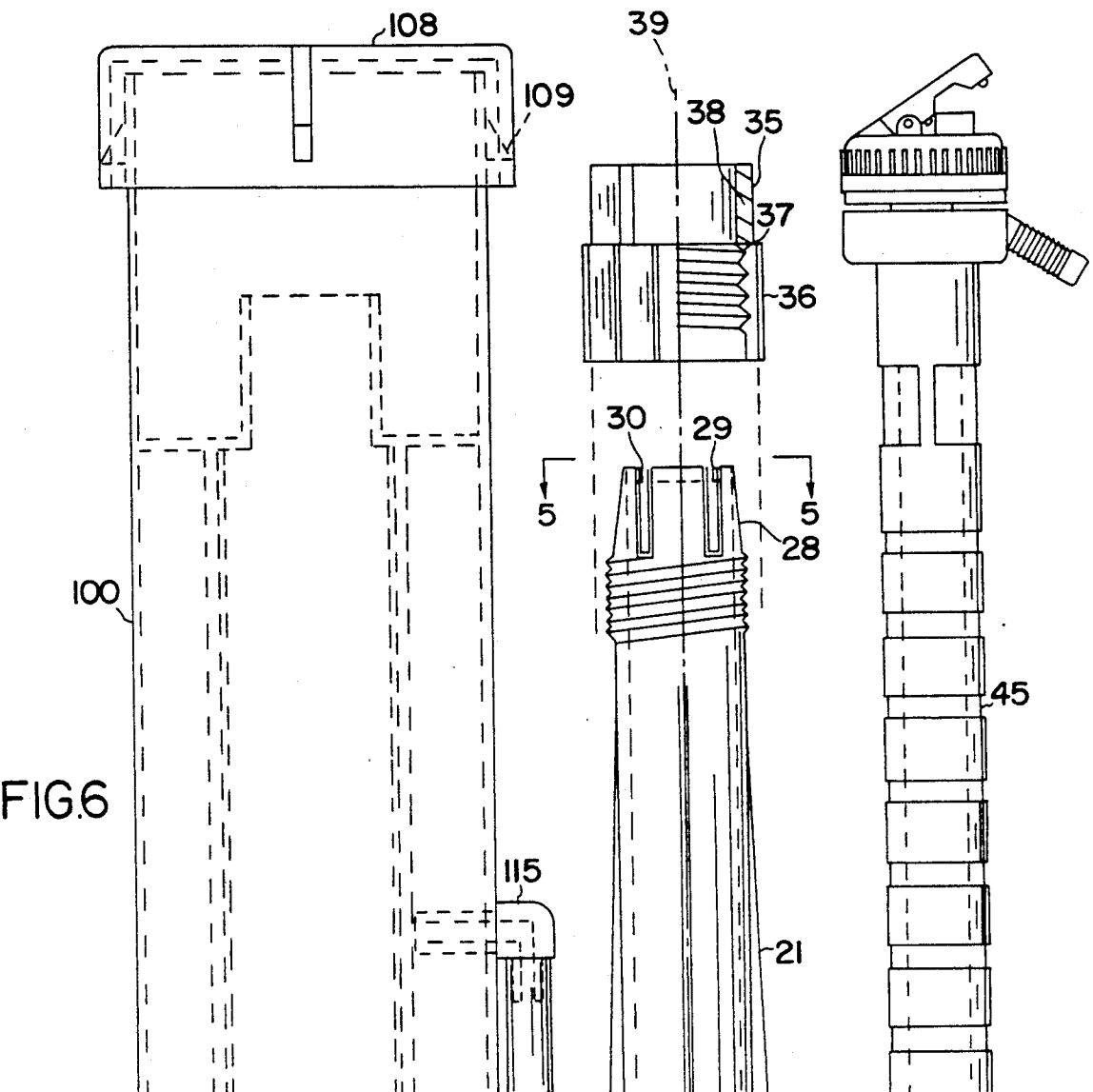
FIG. 3 is a side view of a riser and collet nut used in this invention.
FIG. 4 is a side view of a slider tube used in this invention.
FIG. 5 is a cross-section taken at line 5—5 in FIG. 3.
FIG. 6 is a side view of a float used in this invention.

A toilet tank valve 20 according to this invention is shown in FIG. 1. It is intended to be fitted into a toilet tank (not shown), to establish a level of water therein. A water supply riser 21 includes a conventional spud 22 comprising an external flange 23 and a tapered seal 24. A thread extends through and beyond the bottom of the tank, and a nut (not shown) is threaded onto the thread to hold the valve rigidly assembled to the tank. The tapered seal prevents leakage from the tank past the riser.

The riser has a cylindrical internal passage 25 from end to end, with a smooth internal bore wall 26 over much of its upper length. A collet thread 27 is formed on the outside of the riser tube near its upper end, and four collet fingers 28 rise above the thread. Axially extending slits 29 separate the collet fingers from one another.

The collet fingers are stiffly flexible. A detent rib 30 is formed on the inside of each collet finger. A collet nut 35 has a plurality of external axially extending splines 36 (FIG. 3). An internal thread 37 is proportioned and arranged to engage collet thread 27. A conically tapered compression surface 38 is formed inside the collet nut. When the collet nut is turned so it moves upwardly, the collet fingers are relieved. When it is turned to move downwardly, they are pressed toward central axis 39.

A slider tube 40 (FIG. 4) is placed inside the riser. It has a central flow passage 41 extending from end to end. On its outside wall 42, tube 40 has a pair of seal ring grooves 43, 44 which receive seal rings 45, 46 in compressive opposition between wall 26 and tube 40. Thus, the slider tube 40 is slidably moveable in the riser, and a fluid seal is made between them.

A plurality of detent grooves 45 are formed in the outer wall of the slider tube. These preferably are spaced a uniform and known distance apart, such as one-half inch, so that the height of the valve can precisely be adjusted to some known dimensions.

As can best be seen in FIG. 1, the collet fingers when released enable the slider tube, and thereby valve workings yet to be described, to be moved axially. Then the desired adjustment will be held by tightening down the collet nut.

As best shown in FIGS. 1 and 2, valve workings 50 are mounted to the upper end of the slider tube. These workings become the reference level for operation of the valve itself. Adjusting the height will commensurately adjust the level to which water will be maintained in the tank. Workings 50 include a mounting neck 51 threaded into a thread 52 in the top of the slider tube. A screen 53, which may conveniently be a cylindrical screen with a suitable clearance from the wall of the passage in the slider tube, will screen out larger particulates such as sand and smaller pebbles that tend to get into domestic water systems.

A shoulder 55 compresses a ring seal 56 against the slider tube, and also traps the flange of a diverter cuff 57. This diverter cup is fully shown in Antunez patent application Ser. No. 07/326,916, filed Mar. 22, 1989 which is incorporated herein in its entirety for its showing of a cuff that diverts some water through a bowl fill tube 58 to refill the toilet bowl, and which permits the major portion of the water flow from the workings to pass into the tank through a gap 59 above the peripheral wall of the cuff.

The body 65 of the workings includes a base 66 with discharge ports 67. A supply port 68 extends upwardly into the body from the slider tube, and esters into a region which is divided into a flow chamber 70 and a bias chamber 71.

The division between the two chambers is made by a control diaphragm 73. This diaphragm is flexible so it can flex to a position where it closes an inlet seat 74 at the top of the supply port. It can also be flexed to move away from the inlet seat to open a passage for flow of water to the discharge ports 67. There is no flow to the discharge ports when the diaphragm is pressed against the inlet seat. The diaphragm has a larger area exposed to fluid pressure in the bias chamber than in the flow chamber, so that if there is an equal pressure in both chambers, the diaphragm will flex to close the inlet port.

A bias port 75 passes through the diaphragm. It is preferably formed in a hard grommet 76 that is fixed in the diaphragm. The cross-sectional area of bias port 75 is of considerable importance relative to the rate of opening and of closing the valve, as will later be described. It should be noted that bias port 75 is always open to pressure in the inlet port.

A vent port 85 is formed in a cap 86 which closes the body of the workings. Vent port 85 enters the bias chamber, and whether it is open or closed is the criterion which determines whether valve 20 is open to flow or closed to flow.

A valving ball 90 is placed in the bias chamber. Its diameter is selected so that, when it is unrestrained it will tend to rise and close the vent port. As the consequence of this closure, the pressure in the bias chamber will approach the pressure in the flow chamber. Because of the difference in the exposed areas of the diaphragm, the diaphragm will then move against the inlet port and close it. Displacement of the valving ball from the vent port enables the pressure in the bias chamber to fall, and the diaphragm will move off of the seal of the inlet port. Then water can flow to and out of the diaphragm port, and flow will continue until and unless the vent port is again closed.

It is thereby apparent that, with system pressure on in the riser, flow through the valve depends on whether the vent port is open or is not open. This is a basically old general concept, of which Roosa U.S. Pat. No. 4,341,238 is cited as an illustrated example. This Roosa patent is incorporated herein by reference in its entirety for its showing of a valve of this general type, and as an exemplar of the problems solved by this invention.

The diameter of the vent port is, of course, selected so the ball cannot be extruded through it, and the ball is preferably made of a hard material such as glass. This material is not deformable, and is smooth enough that lime deposits are unlikely to be deposited on it.

An actuator 85 is pivotally mounted to the top of the valve body. Its construction is unique. The smooth and accurate movement of this actuator is very important, and it is undesirable for its movement to require unnecessary force for its movement, or for it to be subjected to binding forces. The object of this invention is promptly to open the valve, when the water level in the tank lowers, and promptly to close the valve when the water level is restored.

This simplistic statement overlooks some serious realities in the toilet field. One is water hammer. Domestic water systems operate over a wide range of pressures. It is not economically possible to design a valve for a plurality of pressure ranges. Instead, a suitable valve must be operable over the entire range of pressures which can be anticipated.

A very slow opening and a very slow closing of the valve could conceivably avoid water hammer at high pressures. This does, however, raise two other problems. One is a slowdown in the cycle, disfavored by most users. Another is the fact that water continues to flow as long as the valve is open. If a minimum accurate discharge is desired, then prompt and relatively quick opening and closing are required.

It goes without saying that whatever opening and closing functions are desired, variations of aperture dimensions will result in variations in performance.

The "cleanliness" of valving at the vent port, and the accuracy of size of the bias port are also of most serious importance in this regard. The size of the bias port in large part determines the rate of closure of the valve, and the size of the vent port determines the rate of opening. It is important that these ports not lime up or silt up. Even more importantly, it is necessary that they be made to close tolerances.

Other the years, loose wires and fixed posts have been placed in the bias port. One example is found in the above-referenced Roosa patent. However, this introduces two sets of tolerances, one for the size of the port, and another for the size of what fits into it. As a consequence, in commercial production, the net size of the orifice can and does vary widely, and substantial production runs produced valves with properties that varied too widely for commercial acceptability. By appropriate means yet to be described, this invention is able to use an unoccluded bias port, formed by a grommet which can be made to very close tolerances, thereby overcoming these disadvantages.

At the vent port, the problem has been found to be one of general instability. This port is quite small, and the rate of flow of water is relatively high. Under these circumstances, the position of the ball at this port can be uncertain during activation. Full shut-off and full-open positions involve no problem, but the transition between them can, and water hammer is the most prominent of them.

The instant inventor has devised a light weight, freely moveable actuator with means to stabilize the valve at critical conditions. A pair of trunnions 90,91 are formed on the top of the body of the valve works. The actuator is a second class lever journaled to these trunnions. A counterweight 92 is formed with an arcuate periphery 93. This does not extend laterally beyond the edge of the body. This enables the works to be assembled or disassembled without damaging the lever. Such damage can occur with prior art devices.

The counterweight is wedge-shaped in edge view (FIG. 2) so it can permit the other end of the lever to raise. The entire assembly is very light. Weight is not particularly necessary, because the internal fluid forces tend to move the lever toward a position in which the vent port will be closed.

The counterweight is on one side of the fulcrum 95 formed at the trunnions. On the other side, the lever extends to a downwardly-extending tip 96 that limits the downward excursion of the lever by striking the top of the body. Between the tip and the fulcrum is an actuator pin 97. It projects downwardly, and at its lowermost position passes through the vent port with a side clearance. The diameter of both pin 97 and of the vent port can be closely controlled in manufacture, so that when the actuator pin is in the vent port, there is an open annular fluid passage which is closely sized, and which limits the rate at which water flows through it. This dampens the initial opening. Once the valve is opened, the sizing is no longer important.

The lower end of the actuator pin 96 has a circular recess 98 with about the same radius as the ball. When it is pressed against the ball, the ball is restrained against sidewise movement, and is cradled in the recess.

Therefore even in the swiftest flow, the ball is held stabilized. Opening and closing of the valve, even at system pressures as high as 200 psi have been profoundly smoother by this feature.

This valve is float operated, and for this purpose has an inverted-cup float 100, which rests freely atop the valve body when the valve is open. When the valve is closed (FIG. 1) the float is at an upper level and will later be described.

Float 100 has a tubular skirt 101, open at its lower end 102. A barrier 103 above the lower end joins the skirt and an internal sleeve 104. A buoyant chamber 105 is formed between the skirt and the sleeve below the barrier. Above the barrier is a weight chamber 106 which is filled with water, and exerts a downward force that is less than the available buoyant force in chamber 105.

Above the barrier, axially extending slit 107 passes the fill tube while enabling the float to move up and down within its limits. A cap 108 is fitted over the top of the skirt and held there by snaps 109.

Axially extending splines 111 are engageable with splines 36 on the collet nut. Now, importantly, the collet fingers can be loosened and tightened merely by rotating the float, and the height of the valve workings can thereby conveniently be adjusted.

Of particular importance is contact surface 110 on the bottom surface of the cap. It is the engagement of this contact surface with the actuator that determines whether the valve is open or closed. The valve will be open when the float is in its lower position, resting on the actuator and will be closed when the float is buoyantly raised out of contact with the actuator so the ball can close the vent port.

An adjustable bleed pipe 115 is pivotally mounted to and through the wall of the skirt. The level of its open free end 116 can be adjusted by turning this pipe in its mounting. If desired, punch-out regions (not shown) can be provided at which this pipe can be selectively mounted.

To complete the means for adjusting the height of the slider tube (and thereby the works), the inside wall of the sleeve is provided with a plurality of axially-extending splines 120 which can engage splines 36 on the collet nut. Now it will be seen that the collet can be loosened and tightened.

Still another problem involved in patents of this general type is the tendency for the bias chamber to silt up. Silting of the major flow path can be a serious problem, but with an appropriate screen, particles so large as to plug up or incapacitate the major flow can be excluded, and smaller particles will pass through. However, the bias chamber while having a substantial flow is still relatively stagnant, and both the bias port and the vent port are relatively small. For this reason, even lesser sizes of particulates can become a long-term problem. Still, to filter *all* of the water to remove all sizes of particulates, can unduly restrict the operation of the valve. This has been a limitation on the utility of this valve, especially in relatively dirty water systems.

The instant inventor has overcome this problem by placing a fine filter 125 over the bias port, riding on the diaphragm itself. Preferably, as shown, it is conical downwardly, so that excluded particulates will wash off or fall off of it. A very fine screen can be used, because its flow effects will be known, and the volume of flow through it is relatively low and slow.

This invention provides a commercially acceptable valve useful for low volume flushing of toilets, reliably useful over a wide range of system pressures, which can readily be serviced, which is quickly and accurately responsive to water levels, and whose height can readily be adjusted without any disassembly of the valve.

This invention is not to be limited by the embodiment shown in the drawings and described in the description, which is given by way of example and not of limitation, but only in accordance with the scope of the appended claims.

I claim:

1. A toilet tank valve having a vertical axis, and a riser adapted to be fitted in a toilet tank to supply water, said riser having a central passage with a smooth internal wall for a substantial portion of its axial length, said riser further including a collet thread and a plurality of flexible collet fingers;

a collet nut having an internal tapered compression surface adapted to compress said collet fingers toward said axis, and a thread engageable to said collet thread, said collet nut further including axially-extending external splines;

a slider tube fitted in said riser, said riser tube having a plurality of peripheral grooves spaced apart from one another in the outer wall of said slider tube, whereby the collet fingers can be engaged in a selected one of said grooves;

a valve mechanism fixed to the outlet end of said slider tube and receiving water from its said valve mechanism including an inlet port, an inlet seat around said inlet port, exhaust ports laterally spaced from said inlet seat, a flexible diaphragm cooperating with said valve seat, said diaphragm forming a flow chamber and a bias chamber, there being a bias port through said diaphragm in fluid communication with said inlet port, a vent port from said bias chamber to atmosphere, a vent seat surrounding said vent port, a valve ball adapted to fit against and close said vent port and to moved away from it to open the vent port for moving said flexible diaphragm toward and away from said valve seat and a lever actuator pivotally mounted to the valve mechanism having an actuator pin movable into said vent port to displace said valve ball, leaving a clearance to vent the bias chamber for moving said flexible diaphragm away from said valve seat;

an inverted cup float slidingly fitted around said riser, said float including a sleeve having axially extending splines to engage the splines on said collet nut, whereby turning said float can tighten or loosen said collet nut as desired to enable adjustment of the slider tube in the riser to select different liquid levels, and a cap on said float having a contact surface to contact the actuator when the water level is lower than a predetermined liquid level.

2. A valve according to claim 1 in which the collet fingers have a rib adapted to enter into the peripheral grooves.

3. A valve according to claim 1 in which a filter is mounted to said diaphragm over said bias port to filter water that is to flow through the bias port.

4. A valve according to claim 3 in which a screen is placed in said slider tube upstream of said inlet port.

5. A valve according to claim 1 in which the actuator pin has a circular recess in its end to contact the valve ball and stabilize the position of the ball while it is displaced from the vent port.

6. A valve according to claim 1 in which the actuator has a limit pin limiting the excursion of the actuator pin into the vent port.

7. A valve according to claim 1 in which a pivoted tube is mounted to the float, whereby the elevation of the free end of the pivoted tube can be changed to adjust the buoyancy of the float.

* * * * *